US006980551B2

(12) United States Patent
Pfister et al.

(10) Patent No.: US 6,980,551 B2
(45) Date of Patent: Dec. 27, 2005

(54) FULL TRANSMISSION CONTROL PROTOCOL OFF-LOAD

(75) Inventors: Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 09/903,723

(22) Filed: Jul. 12, 2001

(65) Prior Publication Data

US 2003/0016669 A1 Jan. 23, 2003

(51) Int. Cl.[7] .............................................. H04L 12/28
(52) U.S. Cl. ..................................... 370/392; 709/227
(58) Field of Search .............................. 370/412, 392, 370/389, 465, 401, 410; 709/219, 227, 228, 709/217

(56) References Cited

U.S. PATENT DOCUMENTS

| 6,263,370 | B1 * | 7/2001 | Kirchner et al. ............ 709/230 |
| 6,473,434 | B1 * | 10/2002 | Araya et al. ................ 370/412 |
| 6,477,586 | B1 * | 11/2002 | Achenson et al. .......... 718/100 |
| 6,654,389 | B1 * | 11/2003 | Brunheroto et al. ........ 370/542 |
| 6,804,815 | B1 * | 10/2004 | Kerr et al. .................. 718/100 |

* cited by examiner

*Primary Examiner*—Andy Lee
(74) *Attorney, Agent, or Firm*—Duke W. Yee; Mark E. McBurney; Wayne P. Bailey

(57) ABSTRACT

A method and system for a queue identification (QI) system which significantly reduces resources required to identify a process associated with receiving an incoming packet is provided. A QI mechanism is used as a TCP option. During a TCP connection establishment process, QI numbers are exchanged for both a sending port and a receiving port of the connection. After the connection is established, the destination QI's number is inserted in a Transmission Control Protocol (TCP) header on outbound packets.

20 Claims, 3 Drawing Sheets

|     | TCP X -202  |                                                          | TCP Y -204      |
| --- | ----------- | -------------------------------------------------------- | --------------- |
| 206 | Closed      |                                                          | Listen          |
| 208 | SYN-Sent    | -> <SEQ=10><CTL=SYN><QIP=5>                              | -> SYN-Received |
| 210 | Established | < - <SEQ=30><ACK=11><CTL=SYN,ACK><QIP=2><QI=5>           | <- SYN-Received |
| 212 | Established | -> <SEQ=11><ACK=31><CTL=ACK><QI=2>                       | -> Established  |
| 214 | Established | -> <SEQ=11><ACK=31><CTL=ACK><QI=2><8 B data>             | -> Established  |
| 216 | Established | <- <SEQ=31><ACK=19><CTL=ACK><QI=5><4B data>              | <- Established  |
| 218 | Established | -> <SEQ=19><ACK=35><CTL=ACK><QI=2>                       | -> Established  |

Figure 2

FULL TRANSMISSION CONTROL PROTOCOL OFF-LOAD

BACKGROUND OF THE INVENTION

1. Technical Field

The present invention relates generally to an improved data processing system, and in particular to a method and apparatus for offloading Transmission Control Protocol (TCP) to hardware.

2. Description of Related Art

When two computers communicate using TCP, incoming TCP packets are identified by a quintuple of the packet's protocol number, source IP address, source port number, destination IP address and destination port number. Using all five fields to associate an incoming packet with a given process complicates hardware TCP implementations. In an effort to improve host processor utilization, TCP/IP functions are being off-loaded to hardware. In a worst case scenario, all five fields from the incoming packet are compared and routed accordingly. To handle the worst case scenario, a relatively large amount of data is used.

Therefore, a more efficient mechanism is needed for determining which process, for example, a thread, a socket or a queue, is associated with an incoming packet. The mechanism described in the present invention describes a TCP option which facilitates offload of normal TCP receive packet processing. The mechanism described in this invention defines how an incoming packet will identify the specific process (queue) that shall receive the incoming packet.

SUMMARY OF THE INVENTION

The present invention provides a method and system for a queue identification (QI) system which significantly reduces resources required to identify a process associated with receiving an incoming packet. A QI mechanism is used as a TCP option. During a TCP connection establishment process, QI numbers are exchanged for both a sending port and a receiving port of the connection. After the connection is established, the destination QI's number is inserted in a Transmission Control Protocol (TCP) header on outbound packets.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a diagram for a three-way handshake for connection synchronization followed by a single segment data transfer in each direction in accordance with a preferred embodiment of the present invention.

DETAILED DESCRIPTION OF THE PREFERRED EMBODIMENT

The present invention provides a network computing system having end nodes, switches, routers, and links interconnecting these components. The end nodes segment a message into packets and transmits the packets over the links. The switches and routers interconnect the end nodes and route the packets to the appropriate end node. The end nodes reassemble the packets into the message at the destination.

Figure 1:
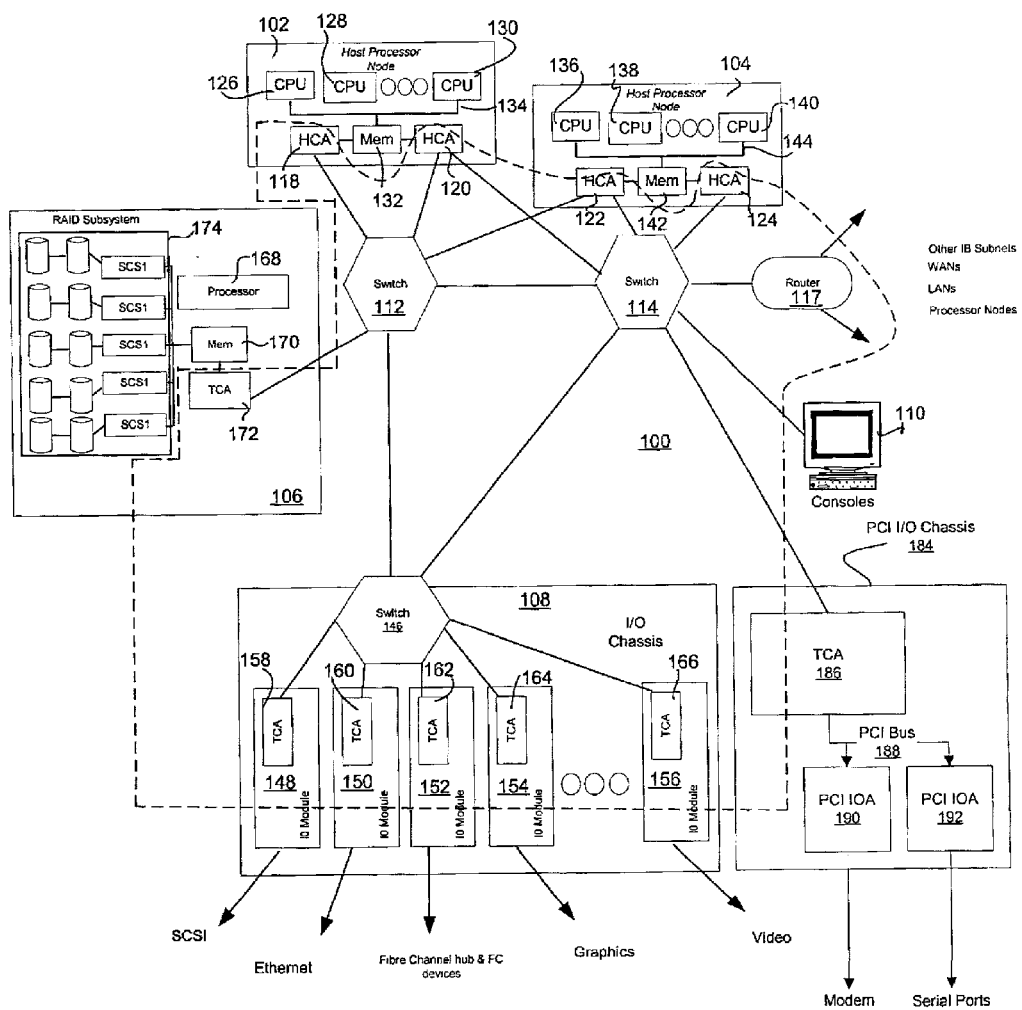
FIG. 1 depicts a diagram of a network computing system in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations.

SAN 100 is a high-bandwidth, low-latency network interconnecting nodes within the network computing system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, I/O chassis node 108, and PCI I/O Chassis node 184. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric 100, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106, I/O chassis 108, and PCI I/O Chassis 184 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144. Host channel adapter 118 provides a connection to switch 112, host channel adapters 120 and 122 provide a connection to switches 112 and 114, and host channel adapter 124 provides a connection to switch 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications. As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop(FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

PCI I/O Chassis node 184 includes a TCA 186 and multiple PCI Input/Output Adapters (IOA) 190–192 connected to TCA 186 via PCI bus 188. In these examples, the IOAs take the form of adapter cards. Example adapter cards illustrated in FIG. 1 include a modem adapter card 190 and serial adapter card 192. TCA 186 encapsulates PCI transaction requests or responses received from PCI IOAs 190–192 into data packets for transmission across the SAN fabric 100 to an HCA, such as HCA 118. HCA 118 determines whether received data packets contain PCI transmissions and, if so, decodes the data packet to retrieve the encapsulated PCI transaction request or response, such as a DMA write or read operation. HCA 118 sends it to the appropriate unit, such as memory 132. If the PCI transaction was a DMA read request, the HCA then receives the response from the memory, such as memory 132, encapsulates the PCI response into a data packet, and sends the data packet back to the requesting TCA 186 across the SAN fabric 100. the TCA then decodes the PCI transaction from the data packet and sends the PCI transaction to PCI IOA 190 or 192 across PCI bus 188.

Similarly, store and load requests from a processor, such as, for example, CPU 126, to a PCI IOA, such as PCI IOA 190 or 192 are encapsulated into a data packet by the HCA 118 for transmission to the TCA 186 corresponding to the appropriate PCI IOA 190 or 192 across SAN fabric 100. The TCA 186 decodes the data packet to retrieve the PCI transmission and transmits the PCI store or load request and data to PCI IOA 190 or 192 via PCI bus 188. If the request is a load request, the TCA 186 then receives a response from the PCI IOA 190 or 192 which the TCA encapsulates into a data packet and transmits over the SAN fabric 100 to HCA 118 which decodes the data packet to retrieve the PCI data and commands and sends the PCI data and commands to the requesting CPU 126. Thus, PCI adapters may be connected to the SAN fabric 100 of the present invention.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

FIG. 1 is intended as an example, and not as an architectural limitation for the present invention and is provided merely for illustrative purposes. The embodiments of the present invention, as described below, may be implemented on computer systems of numerous types and configurations. For example, computer systems implementing the present invention may range from a small server with one processor and a limited number of input/output (I/O) adapters to a massive parallel supercomputer system or systems with, for example, hundreds of processor and thousands of I/O adapters. Furthermore, the present invention may be implemented in an infrastructure of remote computer systems connected by, for example, an Internet or an intranet.

The present invention provides a method and system for enabling a full transmission control protocol (TCP) for an off-load. A benefit of this approach is to reduce the amount of memory required in the processing of data packets. A queue identification mechanism provides a more efficient mechanism for determining which process is associated with an incoming packet. With queue identification, the incoming packet identifies a specific queue that receives the incoming packet. A packet header of the incoming packet contains a queue identification (QI) option, which contains a queue identification (QI) number.

FIG. 2 depicts a diagram for a three-way handshake for connection synchronization followed by a single segment data transfer in each direction in accordance with a preferred embodiment of the present invention. FIG. 2 uses, for example, a convention defined in Internet Engineering Task Force, Request For Comments 793, titled Transmission Control Program. The Internet Engineering Task Force, Request For Comments 793, Transmission Control Program may be found at http://www.ietf.org/rfc/rfc0793.txt?number=793.

In FIG. 2, each line is designated by reference numerals for reference purposes. Right arrows (–>) indicate departure of a TCP segment from TCP X 202 to TCP Y 204, or arrival of a segment at TCP Y 204 from TCP X 202. Left arrows (<31), indicate the reverse.

In this example, TCP "states" represent the state after a departure or arrival of the segment whose contents are shown in the center of each line in FIG. 2. Segment contents are shown in abbreviated form, with sequence number, acknowledge (ACK) field, control flags, and queue identification (QI) field. Other fields, such as, for example, window, addresses, lengths, and text have been left out in the interest of clarity.

In line 206 of FIG. 2, TCP X 202 is in a closed mode and TCP Y 204 is in a listen mode. In line 208 of FIG. 2, TCP X 202 begins by sending a SYN segment with a QI-permitted option selected which indicates that TCP X 202 is requesting the use of a QI option and specifying a QI number (QI=5) that TCP X 202 wishes TCP Y 204 to use for outbound packets.

In line 210 of FIG. 2, TCP Y 204 accepts the use of the QI-permitted option and sends a SYN segment which acknowledges the SYN segment TCP Y 204 received from TCP 202. This SYN segment also carries a QI number for TCP X 202 and defines a QI number (QI=2) TCP Y 204 wishes TCP X 202 to use for outbound packets. At this point, it may be noted that an acknowledgment field may indicate that TCP Y 204 is now expecting to hear a sequence, such as, for example, sequence 11, acknowledging the SYN segment which occupied sequence 10. In line 212 of FIG. 2, TCP X 202 responds with an empty segment containing an ACK for the SYN segment from TCP Y 204, and in line 214, TCP X 202 sends some data which, in this example, is 8 bytes in length. In both lines 212 and 214, TCP X 202 places the QI number (QI=2) requested by TCP Y 204 in the QI option portion of a TCP header.

In line 216 of FIG. 2, TCP Y 204 responds with data which, in this example, is 4 bytes in length, and acknowledges (ACK) the reception of the first data packet from TCP X 202. A response from TCP Y 204 in line 216 places the QI number (QI=5) requested by TCP X 202 in the QI option portion of the TCP header.

Finally, in line 218 of FIG. 2, TCP X 202 responds with an acknowledge (ACK) to the first data packet sent by TCP Y 204. The response from TCP X 202 includes the QI number (QI=2) requested by TCP Y 204 in the QI option portion of the TCP header.

The description of the present invention turns now to a description of queue identification TCP Option performed over, for example, Infiniband, Ethernet, or other networks.

Figure 3:
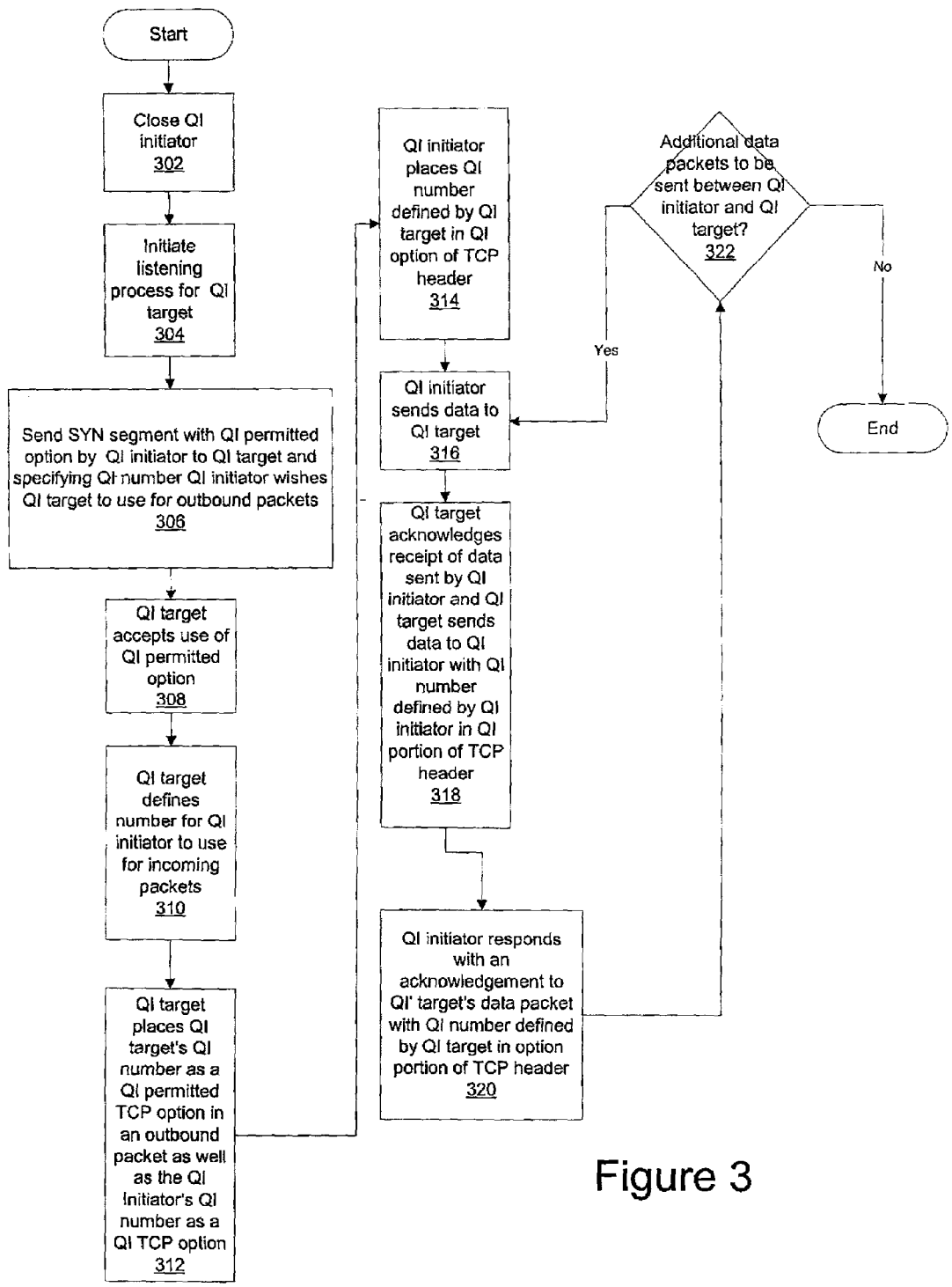
FIG. 3 is an exemplary flowchart illustrating a queue identification protocol in accordance with a preferred embodiment of the present invention.

FIG. 3 illustrates how queue identification provides a more efficient mechanism for determining which process is associated with an incoming packet. With queue identification, the incoming packet identifies the specific queue that receives the incoming packet. A packet header of the incoming packet contains a queue identification (QI) option, which contains a queue identification (QI) number.

A queue identification (QI) extension may use two TCP options. QI extension may be an extended option for a TCP. The first option is an enabling option, called "QI-permitted", which may be sent in a synchronized (SYN) segment to indicate that the QI option is used once a connection is established. A SYN segment is a segment of a packet which has the SYN control flag set (i.e.=1) in the TCP header. The other option is the queue identification itself. The queue identification may be sent over an established connection once permission has been given by the QI-permitted option.

The QI option is included in all segments sent from the TCP that was the target of the TCP QI option to the TCP that initiated the TCP QI option. The QI option itself defines which queue to use. The TCP that was the target of the TCP QI option may be referred to as the QI target and the TCP that initiated the TCP QI option may be referred to as the QI initiator.

First, a QI permitted option is discussed. The QI permitted option may be a six byte option. This six byte option may be sent in a SYN by a TCP that has been extended to receive and process the QI option once the connection has been opened. When sent in a SYN, a QI field may represent the QI number for the source of the TCP packet. A QI number is the number assigned to a specific socket. All communications within a socket use the same QI number. The QI number is assigned when the socket is established. The QI number is assigned by an operating system's socket code. The TCP QI permitted option format may be as follows:

| Kind:    | To Be Determined by the IETF |
|----------|------------------------------|
| Length:  | 4 bytes                      |
| Queue ID:| 4 bytes                      |

Second, the QI option is discussed. The QI target in the QI option format places the QI initiator's QI number as a TCP extension option on all outbound packets. As explained above, the TCP extension option is a field in a packet segment header. TCP uses segments, the underlying network uses packet. A segment may be sent over one or more packets. The QI option format may be as follows:

| Kind:    | To Be Determined + 1 |
|----------|----------------------|
| Length:  | 4 bytes              |
| Queue ID:| 4 bytes              |

The QI initiator may request the use of the QI option by placing a QI-permitted option on the SYN for the connection. If the QI initiator requests the use of the QI option and the QI target accepts the QI option, the QI target generates the QI option under all permitted circumstances defined in Internet Engineering Task Force, Request For Comments 793, titled Transmission Control Program. If the QI target receives a QI-permitted option on the SYN for the connection, the QI target may elect to either generate the QI option or not. If the QI target elects not to generate the QI option and the QI target does not respond with a QI-permitted option on the SYN for the connection, the QI option is sent on that connection to the other side of the connection.

If the QI target has not received a QI-permitted option for a given connection, the QI target does not send the QI option on that connection. If the QI initiator chooses to send a QI-permitted SYN connection TCP QI request, the following rules apply:

A) the QI-permitted option will be included in the SYN;
B) the QI number contained in the QI-permitted option will be the QI number which the QI initiator expects the target QI to use; and
C) if the QI-permitted option is accepted by the QI target, all segments sent by the QI target to the QI initiator contains the QI number.

FIG. 3 is an exemplary flowchart illustrating a queue identification protocol in accordance with a preferred embodiment of the present invention. FIG. 3 provides an example for the case where a queue ID permitted option is accepted by both sides, the sending side and the receiving side, of a connection.

In this example, the operation starts by closing a QI initiator (step 302). Closing the QI initiator means that the QI initiator is not used by any process, for example, a thread, a socket, or the like. A process for listening is initiated for the QI target (step 304). Then a SYN segment is sent with a QI-permitted option by the QI initiator to the QI target specifying a QI number the QI initiator wishes the target to use for outbound packets (step 306). The QI number is used to identify a socket. The QI number is used to select a specific hardware queue in a network card that supports the QI option. The QI target accepts use of the QI permitted option (step 308). The QI target then defines the number for the QI initiator to use for incoming packets (step 310).

The QI target places QI target's QI number as a QI Permitted TCP option in the outbound packet, as well as the QI Initiator's QI number as a QI TCP option (step 312). The QI initiator places the QI number defined by the QI target in the QI option of the TCP header (step 314). The QI initiator sends data to the QI target (step 316). The QI target acknowledges receipt of the data sent by the QI initiator and the QI target sends data to the QI initiator with the QI number defined by the QI initiator in the QI portion of the TCP header (step 318). The QI initiator responds with an acknowledgment to the QI target's data packet with a QI number defined by the QI target in the option portion of the TCP header (step 320). Then a determination is made as to whether or not additional data packets are to be sent between the QI initiator and the QI target (step 322). If no additional data packets are to be sent between the QI initiator and the QI target (step 322:NO), the operation terminates. If additional data packets are to be sent between the QI initiator and the QI target (step 322:YES), the operation returns to step 316 in which the QI initiator sends data to the QI target.

Therefore, the present invention provides for a mechanism to easily determine which socket, such as, for example, a process, a thread, or a queue is associated with incoming TCP packets without needing to perform a quintuple lookup.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enabling a transmission control protocol (TCP) off-load, comprising the steps of:

during establishment of a TCP connection, exchanging at least one queue identification number between a first port and a second port of the TCP connection, wherein the at least one exchanged queue identification number is specified by one port of the first port and the second port for use by another port of the first port and the second port when sending subsequent data packets by the another port; and inserting at least one queue identification number, as determined by the exchanging of the at least one queue identification number between the first port and the second port, in outbound data packets, wherein the first port of the TCP connection sends a data packet to the second port of the TCP connection and the second port of the TCP connection sends a data packet to the first port of the TCP connection.

2. The method as recited in claim 1, wherein the first port of the TCP connection is a sending port and the second port of the TCP connection is a receiving port.

3. The method as recited in claim 1, further comprising:

employing a queue identification option between the first port and the second port to identify a TCP socket to be used by one port of the first port and the second port during subsequent data packet transmissions to another port of the first port and the second port.

4. The method as recited in claim 3, wherein the TCP socket includes a software queue, a hardware queue, and a mixed software queue and hardware queue.

5. The method as recited in claim 3, wherein employing a queue identification option to identify the TCP socket is employed in at least one of a software and hardware implementation.

6. The method as recited in claim 3, wherein the queue identification option is employed to lookup the TCP socket.

7. The method as recited in claim 3, wherein the queue identification option is sent as a part of a synchronization message to establish the TCP connection.

8. A system for enabling a transmission control protocol (TCP) off-load, comprising:

an exchange component, during establishment of a TCP connection, which exchanges at least two queue identification numbers between a first port and a second port of the TCP connection; and an insertion component which inserts at least one of the exchanged queue identification numbers in outbound data packets, wherein the first port of the TCP connection sends a data packet to the second port of the TCP connection and the second port of the TCP connection sends a data packet to the first port of the TCP connection.

9. The system as recited in claim 8, wherein the first port of the TCP connection is a sending port and the second port of the TCP connection is a receiving port.

10. The system as recited in claim 8, further comprising:
an identification component which employs a queue identification option between the first port and the second port to identify a TCP socket to be used by one port of the first port and the second port during subsequent data packet transmissions to another port of the first port and the second port.

11. The system as recited in claim 10, wherein the TCP socket includes a software queue, a hardware queue, and a mixed software queue and hardware queue.

12. The system as recited in claim 10, wherein employing a queue identification option to identify the TCP socket is employed in at least one of a software and hardware implementation.

13. The system as recited in claim 10, wherein the queue identification option is employed to lookup the TCP socket.

14. The system as recited in claim 10, wherein the queue identification option is sent as a part of a synchronization message to establish the TCP connection.

15. A method for communicating between ports of a network connection, comprising the steps of:
during establishment of the network connection, exchanging at least two queue identifications between a first port and a second port of the network connection, wherein a first queue identification of the at least two queue identifications is sent by the first port to the second port, and a second queue identification of the at least two queue identifications is sent by the second port to the first port; and
inserting the first queue identification in outbound data packets from the second port to the first port, and inserting the second queue identification in outbound data packets from the first port to the second port, wherein the first port of the network connection sends a data packet to the second port of the network connection as specified by the second port, and the second port of the network connection sends a data packet to the first port of the network connection as specified byte first port.

16. The method of claim 15, wherein the first queue identification is sent as a part at a synchronization message to establish the network connection.

17. The method of claim 16, wherein the second queue identification is sent by the second port to the first port in a message acknowledging receipt of the synchronization message by the second port.

18. The method of claim 15, wherein the second queue identification is sent by the second port to the first port in a message accepting use of the first queue identification by the second port.

19. A system for performing the steps recited in claim 1.

20. A system for performing the steps recited in claim 15.

* * * * *